(12) United States Patent
Suzuki et al.

(10) Patent No.: US 6,897,592 B2
(45) Date of Patent: May 24, 2005

(54) BOBBIN PROVIDED WITH COVER FOR PROTECTING MAGNET WIRE

(75) Inventors: Yuzuru Suzuki, Shizuoka (JP); Taketoshi Ohyashiki, Shizuoka (JP); Hiroshi Sano, Shizuoka (JP); Hideki Sakiyama, Shizuoka (JP); Kunitake Matsushita, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/651,814

(22) Filed: Aug. 28, 2003

(65) Prior Publication Data

US 2004/0041494 A1 Mar. 4, 2004

(30) Foreign Application Priority Data

Aug. 30, 2002 (JP) ......................................... 2002-253048
Apr. 7, 2003 (JP) ......................................... 2003-103239

(51) Int. Cl.[7] .............................. H02K 3/46; H02K 1/12
(52) U.S. Cl. ............................ 310/194; 310/71; 310/89
(58) Field of Search ............................ 310/89, 71, 194, 310/49 R

(56) References Cited

U.S. PATENT DOCUMENTS

| 2,922,932 | A | | 1/1960 | Glowacki et al. |
| 4,047,061 | A | | 9/1977 | Kilmer et al. |
| 4,135,106 | A | | 1/1979 | Jollois ........................ 310/105 |
| 4,720,646 | A | * | 1/1988 | Torimoto ...................... 310/71 |
| 5,001,379 | A | * | 3/1991 | Katayama .................... 310/194 |
| 5,057,732 | A | * | 10/1991 | Fukaya ........................ 310/208 |
| 5,111,175 | A | * | 5/1992 | Sugiura et al. ............. 336/192 |
| 5,494,255 | A | * | 2/1996 | Pearson et al. ........ 251/129.15 |
| 5,912,517 | A | | 6/1999 | Nishimura et al. ........... 310/71 |
| 5,912,518 | A | | 6/1999 | Misik |
| 6,046,519 | A | * | 4/2000 | Hanazumi et al. ........ 310/49 R |
| 6,455,962 | B2 | * | 9/2002 | Suzuki et al. ................. 310/71 |
| 6,710,503 | B2 | * | 3/2004 | Yamawaki et al. ......... 310/257 |
| 2002/0024265 | A1 | | 2/2002 | Mayumi |

FOREIGN PATENT DOCUMENTS

| DE | 28 29 945 A1 | 1/1980 | .......... H02K/21/08 |
| EP | 1139543 A1 | 10/2001 | ............ H02K/3/52 |
| JP | 63-274335 | 11/1988 | .......... H02K/32/14 |
| JP | 06315256 A | * 11/1994 | .......... H02K/37/14 |

* cited by examiner

Primary Examiner—Burton Mullins
(74) Attorney, Agent, or Firm—Townsend and Townsend and Crew LLP

(57) ABSTRACT

A bobbin comprises: a bobbin body consisting generally of a cylinder having a winding of a magnet wire therearound, and two flanges; and a bobbin cover formed generally into a cylindrical ring. The bobbin body includes a coil termination block protruding radially from an inner flange of the two and having terminal pins for external connection, and the bobbin cover includes a termination protector protruding radially from the bobbin cover and adapted to mate with the coil termination block when the bobbin cover is put over the bobbin body.

9 Claims, 4 Drawing Sheets

BOBBIN PROVIDED WITH COVER FOR PROTECTING MAGNET WIRE

BACKGROUND OF THE INVENTION

1. Field of the Invention

The present invention relates to a bobbin for use in a motor, such as a stepping motor.

2. Description of the Related Art

The stepping motor is extensively used in office automation equipments and automotive applications. The stepping motor rotates stepwise at a fixed angle for each step in response to electrical signals generated by a digital control, thereby performing positioning function. A PM (permanent magnet) stepping motor, which has its rotor comprising a permanent magnet, is one type of stepping motor.

The PM stepping motor is manufactured, for example, such that components constituting a stator, such as stator yokes, a coil composed of a bobbin and a magnet wire wound around the bobbin, and the like, are set in place inside a molding die and integrally molded with resin, as disclosed in the Unexamined Japanese Patent Application KOKAI Publication No. Sho 63-274355. In the manufacturing method disclosed therein, the central axis of a rotor can be aligned to the central axis of the stator with a high degree of accuracy, thereby enhancing the motor performance characteristics. Thus, the manufacturing method mentioned above features the process of resin-molding for integration of components, which enables the components to be simultaneously set in predetermined position.

In the abovementioned manufacturing method, since molten resin is filled in at high pressure during the molding process, the magnet wire wound around the bobbin is likely to suffer deformation thereby causing insulation material of the magnet wire to deteriorate, and consequently triggering a layer short-circuit. And, even before the molding process, the magnet wire can be damaged due to mishandling of the coil.

The same applies not only to stepping motors but also to other type motors that include coils, thus posing a problem that magnet wires provided on bobbins are not satisfactorily protected, and therefore failing to ensure the reliability.

SUMMARY OF THE INVENTION

The present invention has been made in view of the above problem, and it is an object of the present invention to provide a bobbin which securely protects a magnet wire wound around the bobbin.

In order to achieve the object, according to a first aspect of the present invention, a bobbin comprises: a bobbin body composed of a cylinder for having a winding of a magnet wire therearound, and two flanges formed on both ends of the cylinder and adapted to hold the winding in place and cover the sides of the winding; and a bobbin cover adapted to be put over the winding and cover the circumference of the winding.

According to a second aspect of the present invention, in the bobbin of the first aspect, the bobbin cover is formed in a cylindrical ring and has an outer diameter equal to an outer diameter of the flange.

According to a third aspect of the present invention, in the bobbin of the second aspect, the bobbin cover has an axial dimension equal to or slightly smaller than a dimension between respective inner sides of the two flanges of the bobbin body.

According to a fourth aspect of the present invention, in the bobbin of the second or third aspect, the bobbin cover has a slit gap which breaks continuity of the cylindrical ring of the bobbin cover.

According to a fifth aspect of the present invention, in the bobbin of any one of the first to fourth aspects, the bobbin cover is formed of resin material having elasticity.

According to a sixth aspect of the present invention, in the bobbin of any one of the first to firth aspects, the bobbin body and the bobbin cover have respective positioning mechanisms engaging with each other.

According to a seventh aspect of the present invention, in the bobbin of any one of the first to sixth aspects, the bobbin body includes a coil termination block having terminal pins for external connection to which terminations of the magnet wire are connected, and the bobbin cover is configured so as to cover both the winding and the terminations.

According to an eighth aspect of the present invention, in the bobbin of the seventh aspect, the coil termination block is formed so as to radially protrude outward from an inner side flange of the two and has the terminal pins provided at its distal end surface, and the bobbin cover includes a termination protector formed so as to radially protrude outward from the bobbin cover and adapted to cover the coil termination block.

According to a ninth aspect of the present invention, in the bobbin of the eighth aspect, the coil termination block has a predetermined width, and the termination protector has a width equal to or larger than the width of the coil termination block.

According to a tenth aspect of the present invention, in the bobbin of the eighth or ninth aspect of the present invention, the termination protector has a protrusion dimension larger than a protrusion dimension of the coil termination block.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Preferred embodiments of the present invention will hereinafter be explained with reference to the accompanying drawings. By way of example for explanation, a PM stepping motor will be discussed.

Figure 1:
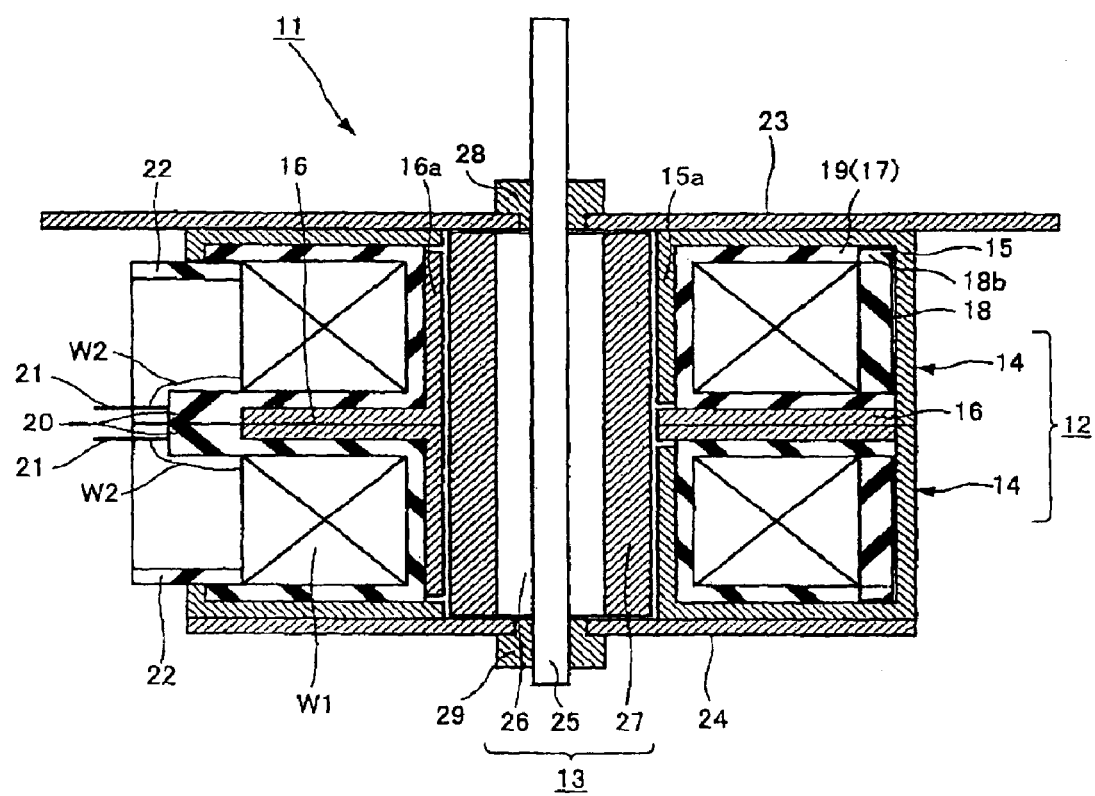
FIG. 1 is a cross-sectional view of a stepping motor comprising a bobbin according to one embodiment of the present invention.

Referring to FIG. 1, a stepping motor 11 generally comprises a stator assembly 12 and a rotor assembly 13.

Figure 2:
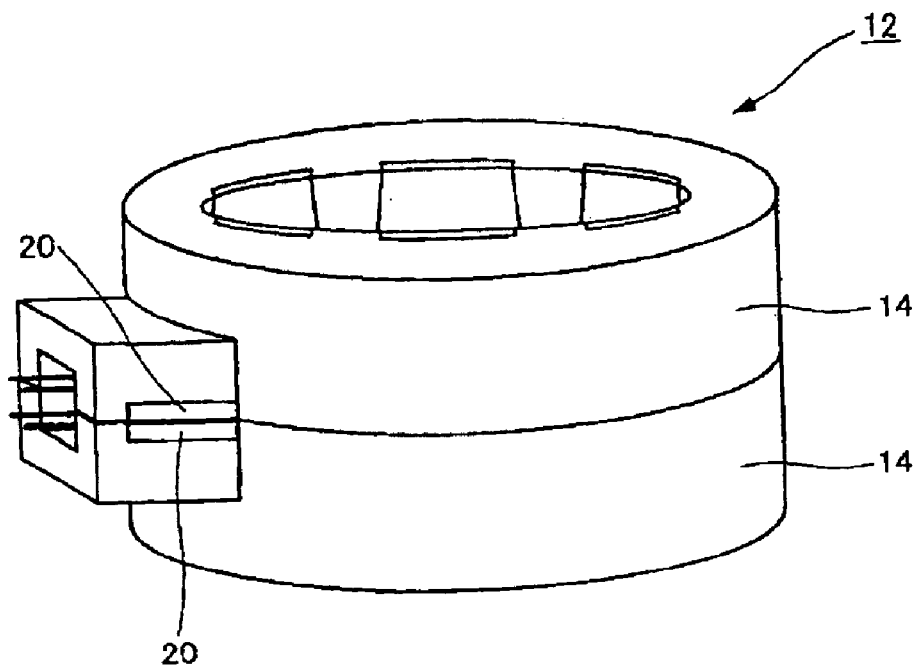
FIG. 2 is a perspective view of a stator assembly schematically shown in FIG. 1.

Referring to FIG. 2, the stator assembly 12 comprises two stator sub-assemblies 14 and 14 attached back-to-back to each other.

Figure 3:
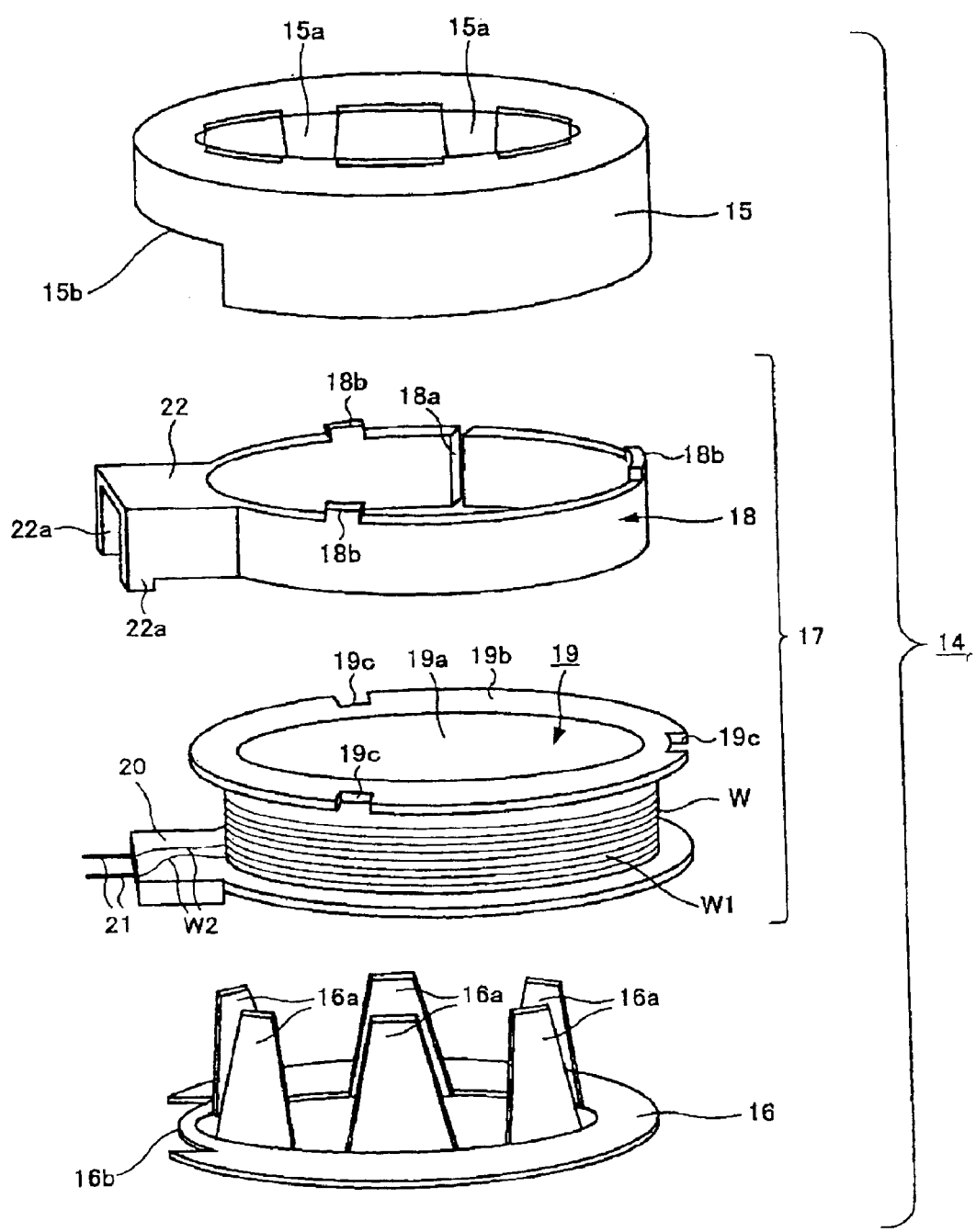
FIG. 3 is an exploded perspective view of one stator sub-assembly shown in FIG. 2, including the bobbin according to the one embodiment.

Referring now to FIG. 3, each of the stator sub-assemblies 14 and 14 comprises an outer stator yoke 15, an inner stator yoke 16, and a bobbin 17 (to be described in detail later) having a coil. The bobbin 17 comprises a bobbin body 19 having the coil therearound, and a bobbin cover 18 (to be described in detail later) adapted to protect the coil.

The outer stator yoke 15 is punched out of a soft-magnetic steel plate, drawn into a cylinder with a wall formed partly on its one end (upper side in the figure), and structures the outer circumferential and outer end walls of the stator sub-assembly 14. The outer stator yoke 15 has a plurality of first pole teeth 15a formed along its inner circumference and bent up, and has a cutout 15b formed in its outer circumferential wall and adapted to let therethrough a termination protector 22 formed integrally with the bobbin cover 18.

The inner stator yoke 16 is punched out of a soft-magnetic steel plate into a ring plate having an outer diameter substantially equal to an inner diameter of the outer circumferential wall of the outer stator yoke 15, and is adapted to engage with the outer stator yoke 16 thus structuring the inner end wall of the stator sub-assembly 14. The inner stator yoke 16 formed into a ring plate as described above has an inner diameter equal to an inner diameter of the outer stator yoke 15 and has a plurality of second pole teeth 16a formed along its inner circumference and bent up.

Figure 4:
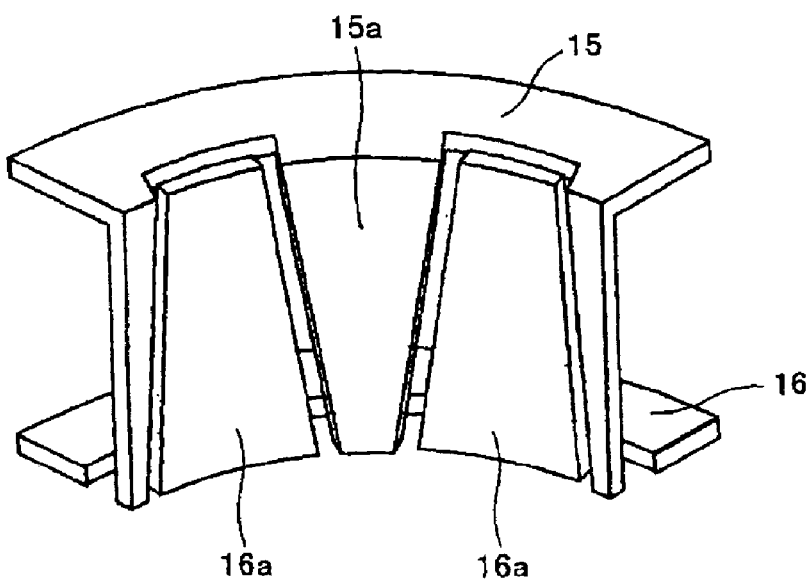
FIG. 4 is an enlarged fragmentary view of outer and inner yokes which engage with each other so as to have their respective pole teeth intermeshing with each other.

Referring to FIG. 4, the pole teeth 15a and 16b each shaped trapezoidal mesh with each other equidistantly. The first pole teeth 15a and the second pole teeth 16a intermesh with each other as shown in the figure, when the outer stator yoke 15 and the inner stator yoke 16 are duly positioned to engage with each other.

Referring again to FIG. 3, the inner stator yoke 16 has a cutout 16b adapted to engage with a coil termination block 20 formed integrally with the bobbin body 19.

The bobbin 17 is made of, for example, resin material, and comprises the bobbin body 19 integrally including the coil termination block 20, and the bobbin cover 18 as described above. The bobbin body 19 includes a cylinder 19a and outer and inner (upper and lower sides, respectively, in the figure) flanges 19b. A magnet wire W is wound around the cylinder 19a with multiple turns and the turns of the magnet wire W are kept in place between the outer and inner flanges 19b. A winding W1 is formed such that the magnet wire W is wound around the bobbin body 19, specifically the cylinder 19a, thus constituting a coil.

The coil termination block 20 is formed continuously from the inner flange 19b in such a manner as to radially protrude outward with a predetermined width for a predetermined length so as to be shaped substantially rectangular. The coil termination block 20 has its one major surface leveled flush with the inner surface of the inner flange 19b facing the winding W1, and has the other major surface elevated from the outer surface of the inner flange 19b by a dimension substantially equal to the thickness of the inner stator yoke 16, whereby the other major surface of the coil termination block 20 is set flush with the surface of the inner stator yoke 16 when the coil termination block 20 engages with the cutout 16b of the inner stator yoke 16. The cutout 16b of the inner stator yoke 16 is shaped to fit the elevated portion on the other major surface of the coil termination block 20 thereby functioning as a means for positioning the coil termination block 20 to engage therewith. The coil termination block 20 shaped substantially rectangular has a distal end surface substantially perpendicular to the radial line of the bobbin body 19, and two terminal pins 21 made of conductive steel are fixedly disposed so as to stand vertically on the distal end surface of the coil termination section 20. Two terminations W2 of the magnet wire W wound around the bobbin body 19 lead out over the one major surface of the coil termination block 20 up to the two terminal pins 21 and are bound around and soldered to the respective terminal pins 21. The terminal pins 21 are configured to fit into holes formed on a flexible printed circuit board (FPC) (not shown) for supplying a current to the magnet wire W thereby enabling the coil to generate magnetic flux.

The bobbin cover 18 is made of elastic material, such as resin material, and formed into a cylindrical ring having a predetermined width (axial dimension—vertical in the figure) and a predetermined thickness (ring wall thickness). The bobbin cover 18 has an outer diameter substantially equal to the outer diameter of the flange 19b of the bobbin body 19. The bobbin cover 18 has a slit gap 18a to break the continuity of its ring structure, whereby the bobbin cover 18 made of elastic material can be engagingly put over the bobbin body 19 without difficulty. The width of the bobbin cover 18 is equal to or slightly smaller than the distance between respective inner surfaces of the outer and inner flanges 19b so that the bobbin cover 18 put over the bobbin body 19 can fit snugly between the outer and inner flanges 19b to duly cover and protect the winding W1 of the magnet wire W.

The bobbin cover 18 also has a plurality (three in this embodiment) of protrusions 18b on one end (upper side in the figure) thereof. The outer flange 19b of the bobbin body 19 is provided with a plurality (corresponding to the number of the protrusions 18b) of notches 19c, and the notches 19c engage with respective protrusions 18b whereby the bobbin body 19 and the bobbin cover 18 are predeterminedly positioned with respect to each other and fixedly attached to each other. In this connection, the protrusions may alternatively be provided on the bobbin body 19 while the notches are provided on the bobbin cover 18, and also the protrusions and the notches may be provided respectively on both ends of the bobbin cover 18 and both flanges 19a and 19b of the bobbin body 19, and vice versa.

The bobbin cover 18 further has the aforementioned termination protector 22 radially projecting outward so as to form a rectangular shape, which makes the outline of the bobbin cover 18 look like a key hole as a whole. The termination protector 22 is formed so as to cover the coil termination block 20 of the bobbin body 19 when the bobbin cover 28 is attached in place over the bobbin body, 19. The termination protector 22 has a predetermined width substantially equal to the width of the coil termination block 20 of the bobbin body 19, thus when the bobbin cover 18 is attached in place over the bobbin body 19, the termination protector 22 and the coil termination block 20 engage with each other such that their respective side surfaces are leveled flush with each other.

The termination protector 22 has a height (vertical dimension in the figure) dimensioned substantially equal to the width of the cylinder portion of the bobbin cover 18. The height of the termination protector 22 may alternatively be dimensioned to be smaller than the width of the cylinder portion of the bobbin cover 18 as long as the two terminations W2 of the magnet wire W are allowed to pass through to the terminal pins 21. The termination protector 22 has a length (protrusion dimension) larger than the length (protrusion dimension) of the coil termination block 20, so as to overhang at least the portion where the two terminations W2 of the magnetic wire W are soldered to the terminal pins 21. The termination protector 22 has two side walls 22a and 22a, between which the terminal pins 21 have their proximal end portions covered. This way, the bobbin cover 18 is configured so as to cover not only the winding W1 of the magnet wire W but also the terminations W2 thereof thus entirely covering up the magnet wire W, which prevents the magnet wire W from deteriorating and getting damaged during the molding or assembly process.

The cutout 15b of the outer stator yoke 15 is shaped so as to let the termination protector 22 pass through and stick out when the stator sub-assembly 14 is completed, and also functions as a positioning means.

Referring back to FIG. 2, the stator assembly 12 is structured such that the two stator sub-assemblies 14 and 14 are attached to each other back-to-back and resin-molded integrally with each other. First and second face plates 23 and 24 are fixedly attached to respective end surfaces of the stator assembly 12 (see FIG. 1) by projection welding or the like. The first and second face plates 23 and 24 are punched out of, for example, a stainless steel plate.

Referring now back to FIG. 1, the rotor assembly 13 comprises a shaft 25, a holder 26 made of metal and having the shaft 25 inserted therein, and a cylindrical magnet 27 arranged around the holder 26 and fixed thereto, and is rotatably supported by first and second bearings 28 and 29 which are attached fixedly to the first and second face plates 23 and 24, respectively, by cramping or the like. The magnet 27 is set coaxial to the shaft 25 and has its outer circumferential surface opposing the first and second pole teeth 15a and 16a with a minute and uniform gap left therebetween. The magnet 27 is fixed to the holder 26 by insert-molding or press-fitting. The magnet 27 has its circumferential surface circumferentially electrically magnetized alternately into S and N poles. When a pulsed driving voltage of a predetermined value is applied to the winding W1 of the stator assembly 12, a first pole tooth 15a may be magnetized into, for example, an S pole, whereby an N pole portion of the magnet 27 is attracted toward the first pole tooth 15a, and the rotor assembly 13 is rotated until the N pole portion comes aligned to the pole tooth 15a. Then, when a pulsed driving voltage with a reverse polarity is applied to the winding W1 of the stator assembly 12, the first pole tooth 15a is now electrically magnetized into an N pole, whereby an S pole portion of the magnet 27 is attracted toward the first pole tooth 15a, and the rotor assembly 13 is rotated until the S pole portion corn s aligned to the pole tooth 15a. Thus, the rotor assembly 13 is rotated by alternately applying pulse voltages with opposite polarities to the winding W1 of the stator assembly 13.

The method of assembling the stepping motor 11 described above will hereinafter be described.

The rotor assembly 13 is assembled such that the shaft 25 is press-fitted into the holder 25, and the magnet 27 is set fixedly around the holder 26.

The stator assembly 12 is assembled as follows. The magnet wire W, whose thickness, length and number of turns are appropriately determined according to the application, is wound around the bobbin body 19, which includes the coil termination block 20. The bobbin cover 18, with the slit gap 18a pushed wide open, is put over the bobbin body 19 so as to cover the winding W1, such that the protrusions 18b of the bobbin cover 18 engage with the notches 19c of the bobbin body 19, whereby the bobbin cover 18 is fixedly attached to the bobbin body 19 in a predetermined manner so that the termination protector 22 mates duly with the coil termination block 20, thus completing the bobbin 17. The inner stator yoke 16 is made to engage with the outer stator yoke 15 sandwiching the bobbin 17, thus completing the stator sub-assembly 14. In this process, the bobbin 17 is positioned with respect to the stator yokes 15 and 16 such that the coil termination block 20 engages with the cutout 15b of the stator yoke 15 and with the cutout 16b of the inner stator yoke 16. Two of the stator sub-assemblies 14 and 14 assembled as described above are set back-to-back to each other by a die and integrally molded to complete the stator assembly 12. In the molding process, resin is caused to flow inside the stator sub-assemblies 14 and 14. The magnet wire W is entirely covered by the bobbin cover 18, thereby preventing the magnet wire W from deteriorating due to the pressure by molding. Also, the bobbin cover 18 prevents the magnet wire W from coming into contact with other components during the assembly process, therefore enhancing the reliability.

The second face plate 24 having the second bearing 29 fixed thereon is fixed to one end surface of the stator assembly 12 by welding or the like, then the rotor assembly 13 is put inside the stator assembly such that one end of the shaft 25 is let through the second bearing 29, and the first face plate 23 having the first bearing 28 fixed thereon is placed over the other end surface of the stator assembly 13 with the other end of the shaft 25 passing through the first bearing 28 and is fixed thereto by welding or the like. The stepping motor 11 thus completed is connected to an FPC or the like.

As described above, the bobbin 17 includes the bobbin cover 18 provided with the termination protector 22 which engages with the coil termination block 20 of the bobbin body 19. The bobbin cover 18 thus structured is adapted to cover not only the winding W1 of the magnet wire W but also the terminations W2 thereof to be connected to the terminal pins 21 for external connection, thereby preventing the magnet wire W from deteriorating and getting damaged during the molding process thus enhancing the rigidity and reliability of the stepping motor 11. Also, since the bobbin cover 18 is formed of elastic material and has the slit gap 18a at its cylindrical ring portion, the bobbin cover 18 can be put over the bobbin body 19 easily thereby improving the workability and product quality. Further, the coil termination block 20 of the bobbin body 19 is covered by the termination protector 22 of the bobbin cover 18 thereby surely keeping the outer stator yoke 15 and the terminal pins 21 insulated from each other and thereby preventing the magnet wire W from getting broken due to mishandling, which results in further improving the reliability of the stepping motor 11.

Figure 5:
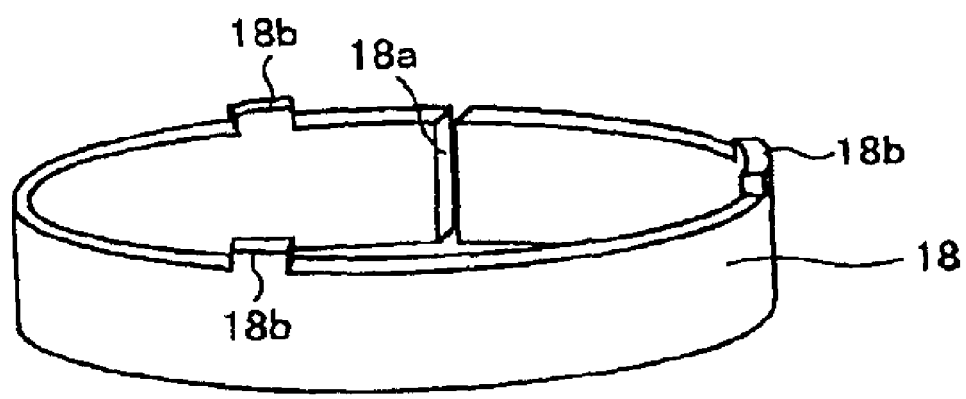
FIG. 5 is a perspective view of a bobbin cover of a bobbin according to another embodiment of the present invention.

It should be understood that the present invention is not limited to the specific embodiment described in this specification. For example, in the embodiment above described, the bobbin cover 18 includes the termination protector 22 for protecting the coil termination block 20 of the bobbin body 19 but may alternatively eliminate the termination protector 22 as shown in FIG. 5. Also, in the embodiment described above, the PM type stepping motor 11 is discussed, but the present invention can be applied to other type stepping motors, or any other type motors, such as spindle motors or servo motors, that employ bobbins having magnet wires wound therearound.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-253048 filed on Aug. 30, 2002 and Japanese Patent Application No. 2003-103239 filed on Apr. 7, 2003 and including specification, claims, drawings and summary. The disclosure of the above Japanese Patent Applications is incorporated herein by reference in its entirety.

What is claimed is:

1. A bobbin comprising:
    a bobbin body composed of a cylinder for having a winding of a magnet wire therearound and two flanges formed on both ends of the cylinder and adapted to hold the winding in place and cover sides of the winding; and
    a bobbin cover adapted to be put over the winding and cover a circumference of the winding;
    wherein the bobbin body includes a coil termination block having terminal pins for external connection to which terminations of the magnet wire are connected, and the bobbin cover is configured so as to cover both the winding and the terminations and the coil termination block is formed so as to radially protrude outward from one flange of the two flanges and has the terminal pins provided at its distal end surface, and the bobbin cover includes a termination protector formed so as to radially protrude outward from the bobbin cover and adapted to cover the coil termination block.

2. A bobbin according to claim 1, wherein the bobbin cover is formed in a cylindrical ring and has an outer diameter equal to an outer diameter of the flange.

3. A bobbin according to claim 2, wherein the bobbin cover has an axial dimension equal to or slightly smaller than a dimension between respective inner sides of the two flanges of the bobbin body.

4. A bobbin according to claim 2, wherein the bobbin cover has a slit gap which breaks continuity of the cylindrical ring of the bobbin cover.

5. A bobbin according to claim 1, wherein the bobbin cover is formed of resin material having elasticity.

6. A bobbin according to claim 1, wherein the bobbin body and the bobbin cover have respective positioning mechanisms engaging with each other.

7. A bobbin according to claim 1, wherein the coil termination block has a predetermined width, and the termination protector has a width equal to or larger than the width of the coil termination block.

8. A bobbin according to claim 1, wherein the termination protector has a protrusion dimension larger than a protrusion dimension of the coil termination block.

9. A bobbin according to claim 1, wherein the bobbin is used for a motor.

* * * * *